United States Patent [19]

Wirges et al.

[11] 4,183,689
[45] Jan. 15, 1980

[54] COLUMN OF TELESCOPICALLY ADJUSTABLE LENGTH

[75] Inventors: Winfried Wirges; Egon Sentinger, both of Koblenz, Fed. Rep. of Germany

[73] Assignee: Stabilus GmbH, Koblenz-Neuendorf, Fed. Rep. of Germany

[21] Appl. No.: 918,847

[22] Filed: Jun. 26, 1978

[30] Foreign Application Priority Data

Jul. 20, 1977 [DE] Fed. Rep. of Germany ... 7722659[U]

[51] Int. Cl.² .......................... F16D 3/80; F16L 17/00
[52] U.S. Cl. ....................................... 403/31; 108/147; 108/144; 297/347; 248/161; 248/404; 403/119
[58] Field of Search ....................... 403/13, 14, 31, 33, 403/15, 109; 52/115; 248/188.5, 400, 404, 125, 157, 161; 108/147, 144; 297/347; 135/75

[56] References Cited

U.S. PATENT DOCUMENTS

| | | | |
|---|---|---|---|
| 3,285,207 | 11/1966 | Vom Hagen | 248/404 UX |
| 3,311,337 | 3/1967 | Vom Hagen | 108/144 X |
| 3,521,341 | 7/1970 | Hörnlein et al. | 248/161 X |

FOREIGN PATENT DOCUMENTS

| | | | |
|---|---|---|---|
| 219790 | 7/1961 | Austria | 108/144 |
| 241055 | 11/1964 | Austria | 108/144 |
| 241740 | 12/1964 | Austria | 108/144 |
| 264760 | 12/1968 | Austria | 108/144 |
| 1429497 | 11/1968 | Fed. Rep. of Germany | 108/144 |

*Primary Examiner*—Wayne L. Shedd
*Attorney, Agent, or Firm*—Brumbaugh, Graves, Donohue & Raymond

[57] ABSTRACT

A column in which an inner elongated member of circular cross section is partly received in the polygonal bore of an outer, tubular member and secured against angular displacement about the common axis by guide elements secured against longitudinal movement in respective recesses of the inner member open toward the outer member and engaging the outer member in respective corners of its polygonal cross section. A manually controlled arresting mechanism permits the two column members to be arrested against relative longitudinal movement in a multiplicity of relative positions.

12 Claims, 8 Drawing Figures

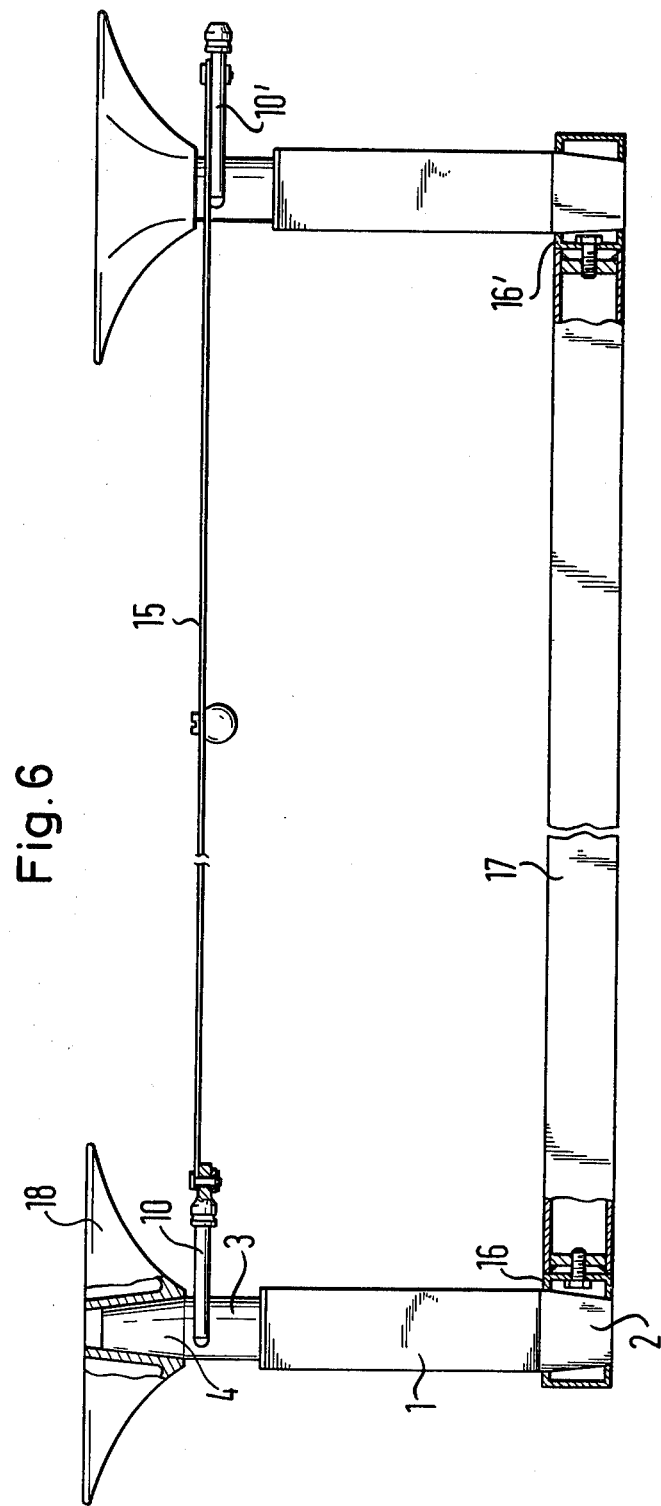

COLUMN OF TELESCOPICALLY ADJUSTABLE LENGTH

This invention relates to columns of telescopically adjustable length, and particularly to a column including an outer, tubular member defining a longitudinal bore of polygonal cross section, and an inner member guided in the outer member for longitudinal movement, but secured against angular displacement, the length of the column being adjustable by relative longitudinal movement of the members, an arresting mechanism permitting such movement to be arrested in a multiplicity of relative positions of the members.

A telescopicing column of the type described has been disclosed in German utility model No. 1,928,659. Its inner member is longitudinally guided in the bore of the outer member by antifriction bearings whose revolving elements are retained in a cage, the cage being suspended from a spring. The known columns are relatively costly to build, and the known guide arrangement is relatively bulky.

It is the primary object of this invention to provide a column of telescopically adjustable length having an outer tubular member of polygonal cross section with guide elements guiding relative longitudinal movement of the outer member and of an inner member and preventing relative angular movement of the members, which column is simple in its structure, capable of being assembled in a simple manner, yet reliable in its operation.

With this object and others in view, as will hereinafter become apparent, the invention provides a column of the type described whose inner member is of circular cross section and is formed with a plurality of recesses open toward the outer member in the bore of the latter. Guide elements partly received in the recesses and secured against longitudinal movement by engagement with the inner member engage the outer member in respective corners of the polygonal cross section of its bore and thereby prevent relative angular displacement of the two members about a longitudinal axis. A manually operable arresting mechanism can arrest relative longitudinal movement of the two members in a multiplicity of relative positions.

The invention also provides a furniture base in which the outer members of two of the afore-described columns are fixedly fastened to each other, and the arresting mechanisms of the two columns include a common control device for simultaneously arresting relative longitudinal movement of the two members of each column, and for simultaneously releasing the members for relative movement.

Other features and many of the attendant advantages of this invention will readily become apparent from the following detailed description of preferred embodiments when considered in connection with the appended drawing in which:

FIG. 6 is a side-elevational view of the base for a table, partly in section.

Figure 1:
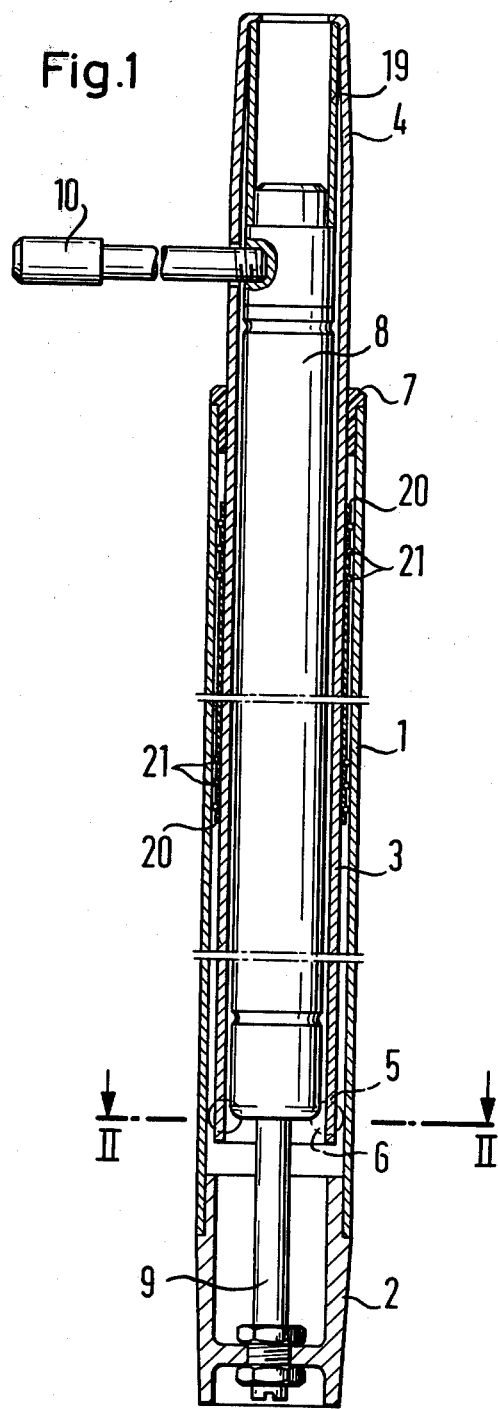
FIG. 1 shows a column of the invention in elevational section.

Referring initially to FIG. 1, there is shown a column of the invention suitable as an adjustable leg for a piece of furniture. An outer, tubular, longitudinal column member 1 is provided at its lower end with a conically tapering, fixedly fastened extension 2 of cast metal for assembly with a base plate or the like. An inner, coaxial, tubular member 3 is partly received in the bore of the outer member 1, and its projecting upper end portion 4 tapers conically for insertion into a mating recess of a supported piece of furniture.

Figure 2:
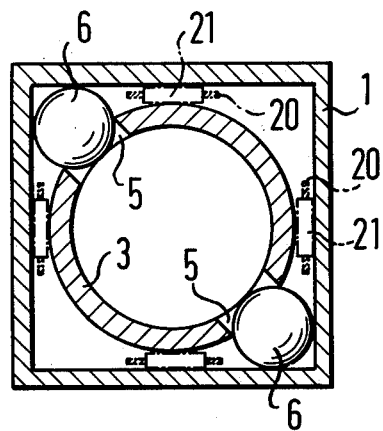
FIG. 2 illustrates the column of FIG. 1 in section on the line II—II, and partly in phantom view.

As is better seen in FIG. 2, the outer member 1 is a square tube of sheet metal, and the portion of the inner tube 3 in the bore of the tube 1 is a hollow sheet metal cylinder whose bottom end is formed with two radial, diametrically opposite through-holes 5 of circular cross section somewhat smaller than the cross section of steel bearing balls 6 partly received in the holes 5 respectively. Each ball 6 engages two rectangularly offset inner face portions of the tube 1 in the corner of the polygonal cross section of the tube defined by the face portions. It makes point contact with the engaged face portions and line contact with the inner cylinder member 3. The balls 6 prevent relative angular displacement of the tube 1 and the inner member 3 and offer only minimal resistance to relative axial displacement of the two column members.

A plastic bushing 7 fastened at the open, upper end of the outer member 1 slidably engages the inner member. The relative longitudinal positions of the column members are secured by an arresting mechanism whose major portion, consisting of a cylinder 8 and elements received therein, is received in the central cavity of the inner member 3. A piston rod 9 coaxially projecting from the bottom end of the cylinder 8 is fixedly fastened to the column extension 2. The cylinder 8 is axially fixed in the inner member 3 by a spacer sleeve 19 and by internal gas pressure as will presently be described. The cylinder may be turned in the inner column member 3 by means of a radial operating arm 10 projecting outward through a circumferentially elongated slot in the end portion 4 of the inner member 3. Bearing needles 21 retained in cages 20 between the four flat inner faces of the tube 1 and the cylindrical outer face of the column member 3 facilitate shortening and lengthening of the tube, the needle bearings being seen in FIG. 2 in phantom view only.

Figure 7:
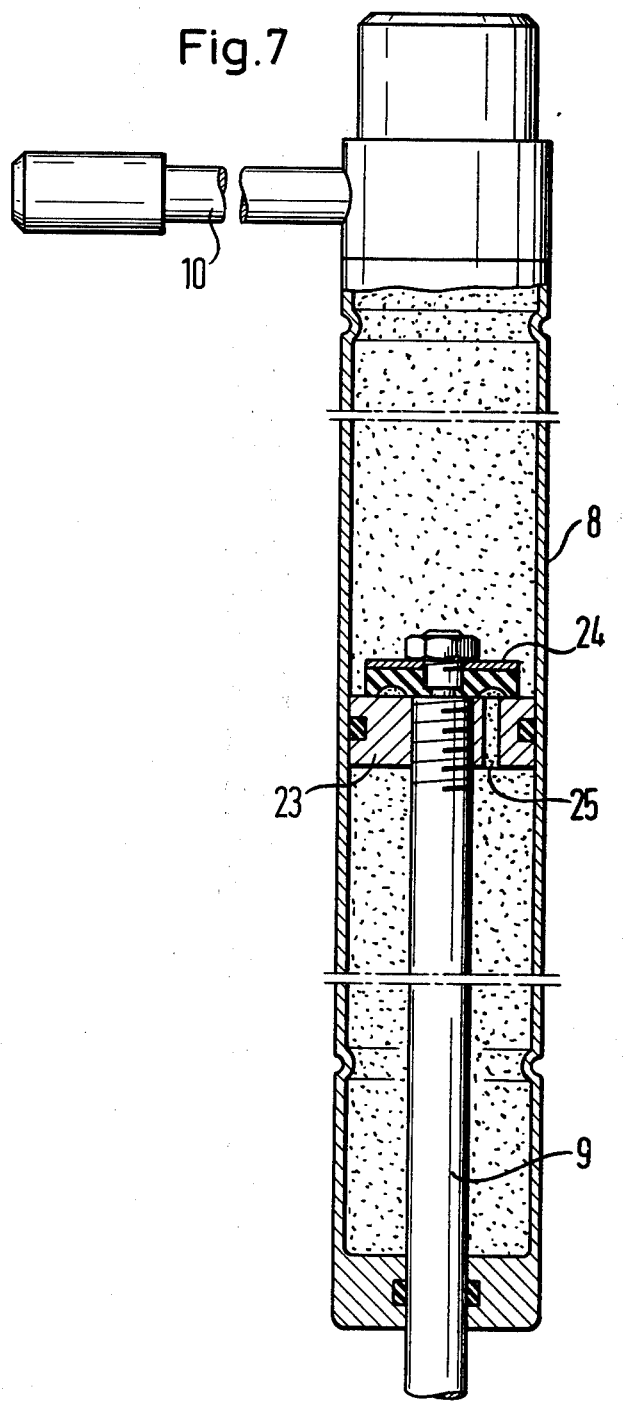
FIG. 7 illustrates an adjustable arresting mechanism for the columns of FIGS. 1 to 7 in elevation, and partly in section.

The arresting mechanism is seen in more detail in FIG. 7. Threads on the end of the piston rod 9 in the cylinder 8 carry a piston 23 which axially divides the cylinder cavity into two compartments filled with compressed air or nitrogen. Axial passages 25 in the piston 23 are sealed in the illustrated condition of the piston by a steel-backed rubber washer 24 fixedly mounted on the piston rod 9. The piston 23 is angularly secured in the cylinder 8 by frictional engagement with the inner cylinder walls.

When the cylinder 8 is turned by means of the arm 10, the piston 23 moves on the threads of the piston rod 9 away from the sealing washer 24, and gas may move freely through the passages 25 of which only one is seen in FIG. 7. The column members 1, 3 may then be moved under external pressure to reduce the overall length of the column, or the gas pressure which pushes the cylinder 8 against the sleeve 19 may be permitted to expel the piston rod 9, and thereby to lengthen the column. When the illustrated relative position of the piston 23 and washer 24 is restored by means of the arm 10, an equilibrium is reached between the gas pressures in the two compartments of the cylinder 8 and the load supported by the column in a fixed, relative longitudinal position of the column members 1, 3. The arresting mechanism thus permits a stepless adjustment of the column length.

Figure 4:
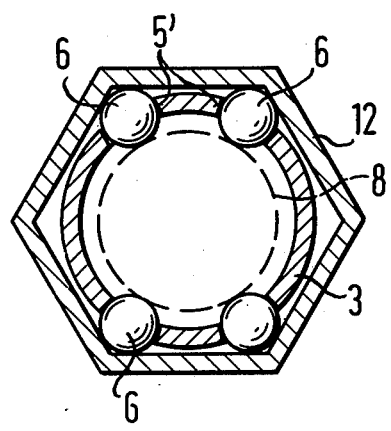

The longitudinal guiding arrangement for the inner and outer column members described above is applicable with obvious minor modifications to outer members whose bores have a polygonal cross section different from the square configuration shown in FIG. 2, as exemplified by an outer column member 12 in FIG. 4 whose cross section is a regular hexagon. Recesses different from the cylindrical holes 5 may secure guide elements different from the bearing balls 6 without significant change in function.

Figure 3:
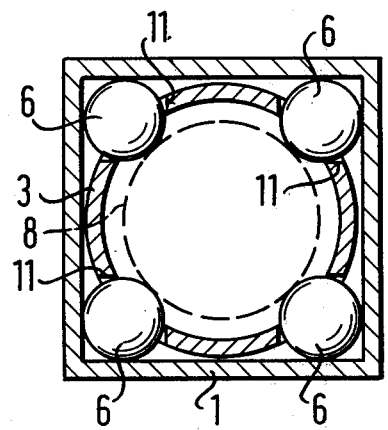
FIGS. 3 to 5 show modified columns in sectional views corresponding to that of FIG. 2.

In the column partly illustrated in FIG. 3, four holes 11 in the inner column member 3 have conical walls dimensioned to permit deeper penetration of the associated four balls 6 than in the device of FIG. 2 without passing the balls whose cross section is still greater than the smallest cross section of the holes 11. The four holes 5' in the inner column member 3 shown in FIG. 4 are radially aligned with respective corners of the hexagonal outer tube 12 and large enough to pass the balls 6 into engagement with the outer face of the cylinder 8, shown in FIG. 4 in phantom view only. It prevents the balls from falling out of the holes 5' even in the position of the column seen in FIG. 1.

Figure 5:
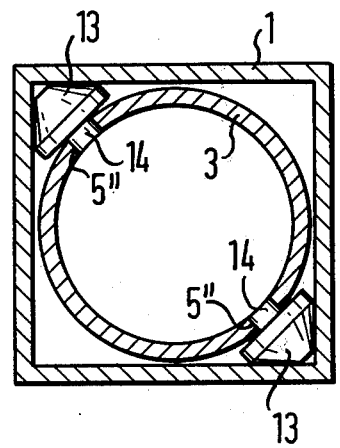

In the column partly shown in FIG. 5, the two guide elements employed each have a conical portion 13 whose apex angle is equal to the angular offset of the two inner face portions of the outer tube 1 which define the cross sectional corner in which the guide element portion 13 is received in line contact with the face portions. A reduced, coaxial, cylindrical stem 14 integrally extends from each conical portion 13 into an associated, conforming hole 5'' of the inner column member.

Figure 5A:
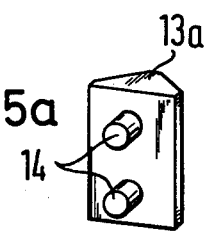
FIG. 5a is a perspective view of an alternative guide element for use in the column partly illustrated in FIG. 5.

A similar guide function is achieved by a guide element of the type shown in FIG. 5a. It has a right prism portion 13a whose bases are rectangular triangles. Two sides of the prism thus match the engaged inner faces of the outer tube 1. Two cylindrical stems 14 project from the third face of the prism into conforming holes of the associated inner column member, not shown.

A typical joint application of two columns of this invention is shown in FIG. 6. The base of a table includes a stretcher 17 provided with fixed cross members 16, 16' at its two ends. The stretcher, cross members, and outer column members 1 consist of the square metal tubing described with reference to FIG. 1, and the conical lower extensions 2 of the two columns are received in mating openings in the cross members 16, 16'. The tapering top portions 4 of the two columns are received conformingly in respective brackets 18 on which a non-illustrated table top may be mounted in a conventional manner.

The operating arms 10, 10' of the two columns are linked by a hingedly fastened rod 15 so that the inner and outer members of the two columns may be released from each other simultaneously for adjusting the table height, or may be arrested simultaneously in desired, matching positions.

It should be understood, of course, that the foregoing disclosure relates only to presently preferred embodiments, and that it is intended to cover all changes and modifications of the examples of the invention herein chosen for the purpose of the disclosure which do not constitute departures from the spirit and scope of the invention set forth in the appended claims.

What is claimed is:

1. A column of telescopically adjustable length comprising:
   (a) an outer, elongated, tubular member bounding a longitudinal bore of polygonal cross section;
   (b) an inner, elongated member of substantially circular cross section having a longitudinal portion received in said bore for longitudinal movement relative to said outer member, said portion being formed with a plurality of recesses open toward said outer member;
   (c) a plurality of guide elements partly received in said recesses respectively and substantially secured against longitudinal movement relative to said inner member by engagement with said inner member, said elements engaging said outer member in respective corners of said polygonal cross section and thereby preventing relative angular displacement of said members about a longitudinal axis; and
   (d) manually operable arresting means for arresting said movement in a multiplicity of relative longitudinal positions of said members.

2. A column as set forth in claim 1, wherein said inner member is tubular and defines a cavity therein, said arresting means include a lifting mechanism having a major portion received in said cavity, another longitudinal portion of said inner member projecting longitudinally from said outer member, and said recesses are also open toward said cavity.

3. A column as set forth in claim 2, wherein said recesses are formed in a terminal part of said inner member remote from said other portion.

4. A column as set forth in claim 2, wherein said inner member has a longitudinal axis, said polygonal cross section has two corners, said inner member is formed with two recesses aligned with said two corners respectively in a direction radial relative to said axis, and two of said elements are received in said two recesses and engaging said outer member in said two corners respectively, said two corners being diametrically opposite each other relative to said axis.

5. A column as set forth in claim 2, wherein said elements are spherical.

6. A column as set forth in claim 4, wherein the cross section of each of said elements is greater than the smallest cross section of the receiving recess.

7. A column as set forth in claim 5, wherein said major portion of said lifting mechanism has a face opposite said recesses in said cavity, said face constituting a stop for said elements in a direction radial relative to said axis.

8. A column as set forth in claim 2, wherein said elements taper conically in a direction from said recess toward said corners respectively.

9. A column as set forth in claim 8, wherein said outer member has a plurality of angularly offset inner face portions, each of said corners being bounded by two of said face portions, each element tapering toward the associated corner at an apex angle substantially equal to the angle defined by the face portions bounding said associated corner.

10. A column as set forth in claim 8, wherein each element has a cylindrical portion conformingly received in one of said recesses.

11. A furniture base comprising two columns as set forth in claim 1, fastening means fixedly fastening the outer members of said columns to each other, the arresting means of said columns including common control means for simultaneously arresting relative longitudinal movement of the members of said two columns, and for simultaneously releasing said members for relative movement.

12. A base as set forth in column 11, wherein the arresting means of each of said columns include a control element movable between a movement arresting position and a member releasing position, and said control means include a linkage connecting said control elements for joint movement between said positions thereof.

* * * * *